US006976110B2

(12) United States Patent  
Moyer et al.

(10) Patent No.: US 6,976,110 B2  
(45) Date of Patent: Dec. 13, 2005

(54) METHOD AND APPARATUS FOR REDUCING INTERRUPT LATENCY BY DYNAMIC BUFFER SIZING

(75) Inventors: William C. Moyer, Dripping Springs, TX (US); John H. Arends, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 166 days.

(21) Appl. No.: 10/740,157

(22) Filed: Dec. 18, 2003

(65) Prior Publication Data

US 2005/0138255 A1    Jun. 23, 2005

(51) Int. Cl.[7] .............................................. G06F 13/24
(52) U.S. Cl. ....................................... 710/260; 710/56
(58) Field of Search ............................... 710/56, 18, 52, 710/260, 266, 57, 53, 74, 310, 48; 370/282; 712/42, 43; 711/100; 713/100; 718/105

(56) References Cited

U.S. PATENT DOCUMENTS

| 5,712,991 A | | 1/1998 | Wichman et al. |
| 5,822,618 A | * | 10/1998 | Ecclesine ..................... 710/57 |
| 5,864,714 A | | 1/1999 | Tal et al. |
| 6,085,277 A | * | 7/2000 | Nordstrom et al. ......... 710/263 |
| 6,108,720 A | * | 8/2000 | Tal et al. ..................... 710/20 |
| 2002/0052995 A1 | | 5/2002 | Jahnke et al. |
| 2002/0052999 A1 | | 5/2002 | Jahnke et al. |

OTHER PUBLICATIONS

"System level performance analysis—the SymTA/S approach" by Henia et al. (abstract only) Publication Date: Mar. 2005.*

Related Application, U.S. Appl. No. 10/322,313, filed Dec. 18, 2002.

* cited by examiner

*Primary Examiner*—Gopal C. Ray
(74) *Attorney, Agent, or Firm*—Robert L. King

(57) ABSTRACT

A method for reducing interrupt latency in a data processing system wherein a storage device is provided having a predetermined maximum number of storage locations. Data execution circuitry is coupled to the storage device for providing data to the storage device and storing the data in the storage device. Interrupt control circuitry is coupled to the data execution circuitry, wherein the interrupt control circuitry interrupts the data execution circuitry. The data stored in the storage device is completely outputted, thereby having an associated interrupt latency resulting from the output of the stored data. The storage capacity of the storage device is changed dynamically to minimize the interrupt latency. The storage device has a utilization value that varies between a predetermined minimum number of storage locations and the predetermined maximum number of storage locations based upon an operating mode of the data processing system.

21 Claims, 3 Drawing Sheets

| LIMIT CONTROL REGISTER OF CONTROL LOGIC 142 | | |
|---|---|---|
| HIGH PRIORITY INTERRUPT DISABLED LIMIT VALUE | LOW PRIORITY INTERRUPT DISABLED LIMIT VALUE | NO INTERRUPTS DISABLED LIMIT VALUE ... |

FIG. 3

| LIMIT CONTROL REGISTER OF CONTROL LOGIC 142 |
|---|
| DYNAMIC LIMIT VALUE |

FIG. 4

| LIMIT CONTROL REGISTER OF CONTROL LOGIC 142 | | | |
|---|---|---|---|
| PROCESS 0 LIMIT VALUE | PROCESS 1 LIMIT VALUE | ... | PROCESS N LIMIT VALUE |

FIG. 5

METHOD AND APPARATUS FOR REDUCING INTERRUPT LATENCY BY DYNAMIC BUFFER SIZING

CROSS-REFERENCE TO RELATED APPLICATION

This application is related to copending U.S. patent application Ser. No. 10/323,313 entitled "Shared Write Buffer In A Peripheral Interface And Method Of Operating" filed Dec. 18, 2002 and assigned to the assignee hereof.

FIELD OF THE INVENTION

The present invention relates to a data processing system, and more particularly, to a store buffer in a data processing system.

RELATED ART

Store buffers are commonly used in high performance processors to enable write cycles to be retired prior to actual completion to memory, thus freeing the processor to continue execution of the instruction stream. Store buffers also provide the ability to decouple writes to long latency memory, giving an important performance advantage at a low cost. In a cacheless processor, buffer performance becomes even more critical.

A store buffer includes a number of address/data/attribute storage locations which are used to buffer sequences of write operations for transfer into main memory at a later time. These transfers occur in FIFO order and allow for smoothing bursty write traffic from the processor to slower memory. Current store buffer techniques use a fixed buffer size that does not allow for a trade-off to occur between interrupt latency and store buffer performance caused by variations in the flux of interrupt requests and the types of interrupt requests.

Therefore, a need exists for an improved data processing system that allows interrupt latency to be traded off for store buffer performance.

BRIEF DESCRIPTION OF THE DRAWINGS

The present invention is illustrated by way of example and not limited by the accompanying figures, in which like references indicate similar elements, and in which:

FIG. 3 illustrates, in table form, a control register in accordance with one embodiment of the present invention;

FIG. 4 illustrates, in table form, a control register in accordance with one embodiment of the present invention; and FIG. 5 illustrates, in table form, a control register in accordance with one embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

As used herein, the term "bus" is used to refer to a plurality of signals or conductors which may be used to transfer one or more various types of information, such as data, addresses, control, or status. The terms "assert" and "negate" are used when referring to the rendering of a signal, status bit, or similar apparatus into its logically true or logically false state, respectively. If the logically true state is a logic level one, the logically false state is a logic level zero. Furthermore, the memory described herein may be any type of memory, such as, for example, a read-only memory (ROM), a random access memory (RAM), static random access memory (SRAM), non-volatile memory (e.g. Flash), and MRAM, etc.

Figure 1:
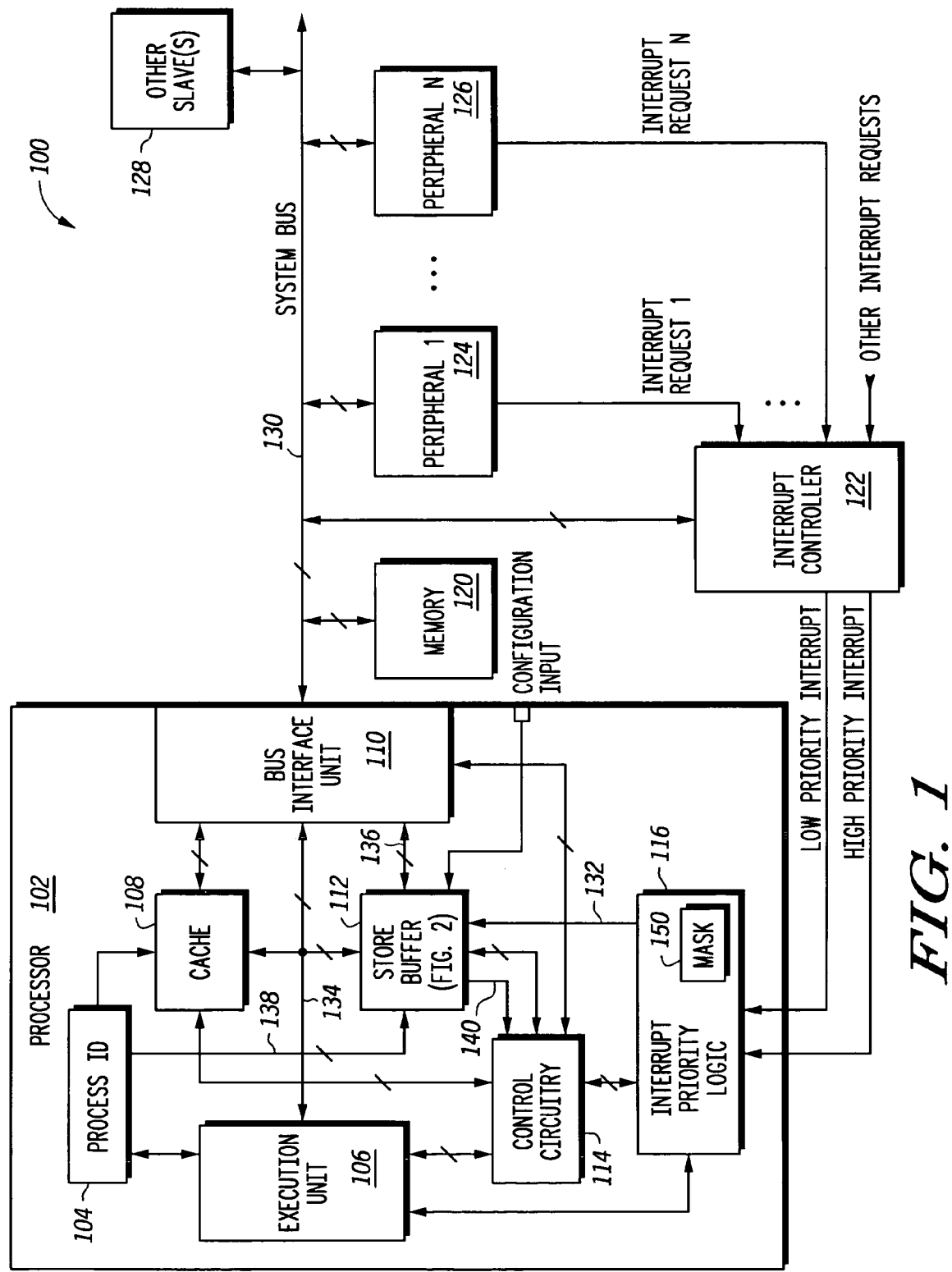
FIG. 1 illustrates, in schematic form, a data processing system in accordance with one embodiment of the present invention.

FIG. 1 illustrates, in block diagram form, a data processing system 100 in accordance with one embodiment of the present invention. Data processing system 100 includes processor 102, a memory 120, a peripheral 124, a peripheral 126, other slaves 128, a system bus 130, and an interrupt controller 122. Processor 102 may be any type of processor such as a microcontroller, microprocessor, digital signal processor (DSP), ASIC, or the like. Processor 102 includes a process ID 104, a cache 108, a bus interface unit 110, a store buffer 112, an execution unit 106, control circuitry 114, and interrupt priority logic 116. In some embodiments, cache 108 may not be present, thus is optional.

Process ID 104 is coupled to cache 108, store buffer 112, and execution unit 106. Cache 108 is coupled to bus interface unit 110, control circuitry 114, store buffer 112, and execution unit 106. Store buffer 112 is coupled to bus interface unit 110, interrupt priority logic 116, control circuitry 114, process ID 104, cache 108, and execution unit 106. Control circuitry 114 is coupled to store buffer 112, cache 108, execution unit 106, interrupt priority logic 116, and bus interface unit 110. In particular, signals 134 are communicated via bidirectional buses between cache 108, execution unit 106, store buffer 112 and bus interface 110. Signals 136 are communicated via a bidirectional bus between store buffer 112 and bus interface unit 110. Interrupt priority logic 116 is coupled to store buffer 112, control circuitry 114, execution unit 106, and interrupt controller 122. Memory 120, peripheral 124, peripheral 126 and other slaves are coupled to each other and to bus interface unit 110 via system bus 130. Interrupt controller 122 is coupled to interrupt priority logic 116, peripheral 124, and peripheral 126, as well as other interrupt sources within data processing system 100.

In operation, processor 102 receives instructions from a software program stored in memory 120 via system bus 130. Memory 120 may be any type of memory including, but not limited to, static random access memory, dynamic random access memory, or any type of non-volatile memory, such as for example, flash. Bus interface unit 110 of processor 102 directs the instructions and corresponding data to execution unit 106 of data processing system 100.

Execution unit 106 executes the instructions received from memory 120, directing write operations to store buffer 112, thus allowing execution unit 106 to be free to execute other instructions. Execution unit 106 loads the address, data, and attribute (ADA) entry corresponding to a specific write operation into an ADA slot in store buffer 112.

The capacity of store buffer 112 is an important component of the performance of processor 102 since the number of bufferable stores determines whether store buffer 112 will be capable of buffering a set of consecutive writes from processor 102 without becoming full and causing stall conditions to occur. Stall conditions must occur when the capacity of store buffer 112 is insufficient to handle a sequence of processor 102 writes, thus, in general, as the size of store buffer 112 is increased, data processing system 100 performance improves.

The tradeoff between interrupt latency and data processing system 100 performance occurs because in at least some embodiments of data processing system 100, interrupt requests are not acknowledged by processor 102 until store buffer 112 has been completely emptied, in order to avoid any memory coherency issues between processor 102, and the interrupt requestors of data processing system 100. Interrupt boundaries may occur assuming that memory 120 has received the most recent values generated by processor 102, thus allowing peripherals 124–126 to have access to coherent shared memory data. Since store buffer 112 may contain updated data values relevant to an interrupt requestor of data processing system 100, it must be flushed of all valid entries prior to acknowledging an interrupt request made by a requestor who may assume that memory 120 contains the latest store data at the time an interrupt is acknowledged. Access to memory 120 for the purposes of emptying stores from store buffer 112 may take multiple cycles, thus delaying the response time of processor 102 for handling a pending interrupt. Each valid entry in store buffer 112 contributes to the overall interrupt latency seen by an interrupt requestor of data processing system 100. By allowing for the dynamic limitation of the number of utilized entries within store buffer 112, a tradeoff may be made by the user of data processing system 100 of performance verses worst case interrupt latency.

Figure 2:
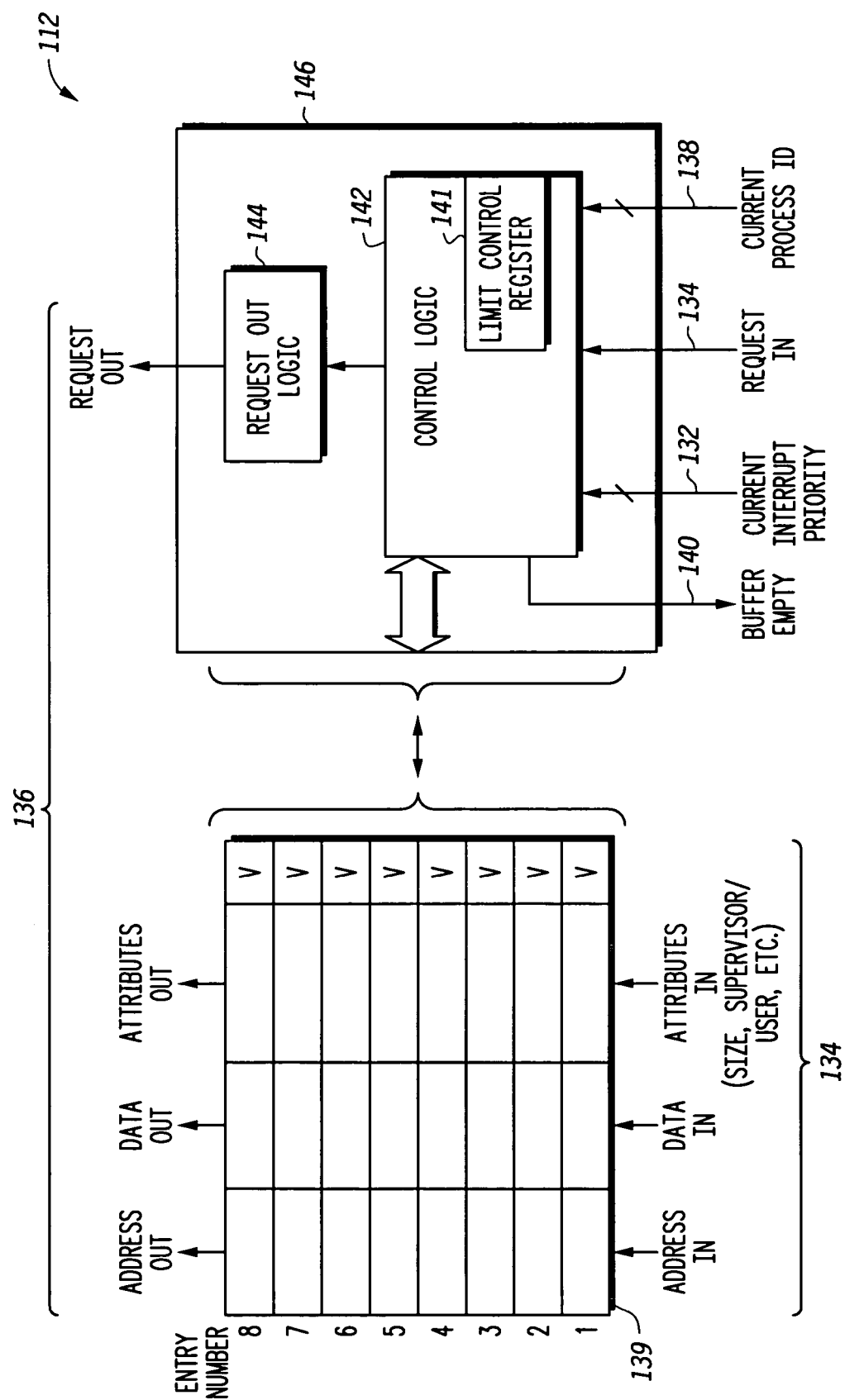
FIG. 2 illustrates, in schematic form, a store buffer in accordance with one embodiment of the present invention.

Store buffer 112 will now be described with reference to FIG. 2. Signals 134 include the ADA slots made up of input address bits, input data bits and input attributes, validity bits, V, and an input request signal (Request In) from the execution unit 106, cache 108 or bus interface unit 110. The signals 136 that are output from store buffer 112 to bus interface unit 110 are Address output bits (Address Out), Data output bits (Data Out), Attribute output bits (Attributes Out) and a Request output signal (Request Out). Store buffer 112 includes storage control 146, ADA slots 139, request out logic 144, and control logic 142 including the limit control register 141.

Store buffer 112 includes a predetermined number of ADA slots, however, only a limited number of ADA slots are used by store buffer 112 based on the operation mode of data processing system 100. The depth of the limited number of ADA slots is adjustable and determined by the operation mode of the data processing system and the corresponding limit values stored in the limit control registers in FIG. 3, FIG. 4, and FIG. 5.

Each ADA slot is assigned an entry number and includes an address slot, a data slot, an attribute slot, and a flag bit slot. The flag bits associated with each ADA slot denote whether the ADA slot has been loaded with the address/data/attributes. For example, when an ADA slot is loaded with an ADA entry, the flag bit may be set as valid and assigned a logic 1 value. When an ADA slot is not loaded with an ADA entry or the ADA entry is invalid, the flag bit may be set as invalid and assigned a logic 0 value. Control logic 142 determines and selects which of the ADA slots an ADA entry is allocated to. For example, in one embodiment of the present invention, a FIFO methodology may be used, i.e., an ADA entry may be removed from store buffer 112 in the order in which the ADA entry is received. When an ADA entry from store buffer 112 has been written into memory 120, the ADA entry is available for storage as per control logic 142.

As stated previously, data processing system 100 may utilize at least one of the operation modes depicted in FIG. 3, FIG. 4, and FIG. 5. The operation modes include, but are not limited to, a dynamic limit mode, a priority interrupt mode, and a process limit mode. The operating mode of data processing system 100 may be user programmable and/or hardwired and stored internal or external to store buffer 112.

The priority interrupt mode will now be described further in detail. When data processing system 100 utilizes the priority interrupt mode (as depicted in FIG. 3), the limit values in limit control register 141 are selected based upon the MASK values from MASK register 150 provided from interrupt priority logic 116. Each type of interrupt has its own corresponding mask (enable) bit. That is, the bit values in MASK register 150 dictate whether, for example, low priority interrupts, high priority interrupts, or both low and high priority interrupt requests are ignored by execution unit 106. Once an interrupt request of a given priority is acknowledged, processing of further interrupt requests of the same priority is disabled by interrupt priority logic 116 setting the mask bit corresponding to the interrupt which is acknowledged. This allows for a software interrupt service routine to perform appropriate processing to handle the interrupt without a further interrupt occurring. Once software determines that it is appropriate, it may clear the mask values, thus re-enabling interrupts of a given priority. In some embodiments, acknowledging a high priority interrupt will result in interrupt priority logic 116 setting mask bits in MASK register 150 to disable both high and low priority interrupts, such that handling of the high priority interrupt will not be disturbed with a low priority interrupt. Based on the current interrupt priority utilized by interrupt priority logic 116 and provided to store buffer 112 via conductor 132, control logic 142 of store buffer 112 determines the depth of store buffer 112. For example, if the mask bits in MASK register 150 are set such that high priority interrupt requests are disabled, then control logic of store buffer 112 will select the "High Priority Interrupt Disabled" limit value from limit control register 141 of control logic 142 such that the ADA store buffer depth may be configured in a suitable manner for handling high-priority interrupts with appropriate latency/performance tradeoffs. In contrast, if mask bits of MASK register 150 are set such that only low priority interrupt requests are disabled, control logic 142 selects the "Low Priority Interrupt Disabled" limit value such that the ADA store buffer depth may be configured in a suitable manner for handling low-priority interrupts with appropriate latency/performance tradeoffs. For the case where mask bits of MASK register 150 are set such that all interrupt requests are acknowledged, control logic 142 of store buffer 112 selects a limit value such that the depth of store buffer 112 is configured in a suitable manner for awaiting a new interrupt request with appropriate latency/performance tradeoffs. In other words, the depth of store buffer 112 is dynamic based on the operation mode and the limit values in limit control register of control logic 142.

The dynamic limit value operation mode will now be discussed further in detail with reference to FIG. 4. When data processing system is in dynamic limit value mode, the depth of store buffer 112 may be increased, decreased, or remain the same based on the frequency of interrupt requests received from interrupt priority logic 116. For example, there may be certain instances in data processing system 100 when peripheral 124 is, for example, a camera phone and the camera phone is turned off. Interrupts may no longer be generated from peripheral 124 (since it is turned off) and the number of interrupt requests from interrupt controller 122 may decrease, allowing the depth of store buffer 112 to be temporarily increased. When the camera phone is turned on, interrupt requests may be generated more frequently, requiring the depth of store buffer 112 to be temporarily decreased to accommodate for the increased number of interrupt requests. In this sense, the depth of store buffer 112 may be adjusted to account for the increase, decrease, or stabilization of interrupt request activity.

In another example of the dynamic limit value operation mode, if peripheral 124 is, for example, an MP3 player that requires an increased sample rate, more interrupt requests may be generated by the MP3 player to account for the higher sampling rate requirement. Thus, as one example of a benefit of the present invention, the depth of store buffer 112 may be decreased (and thus the interrupt latency decreased) to accommodate for the increased number of interrupt requests generated by the MP3 player. Hence, based on the current operation mode and the dynamic limit value in limit control register 141, the depth of store buffer 112 may be adjusted accordingly.

The process ID operation mode will now be described in detail with reference to FIG. 5. In one embodiment of the present invention, execution unit 106 sets the process ID based on the current process or processes being run by processor 102. The current process ID is provided to store buffer 112 via conductor 138 and indicates to store buffer 112 which process or processes are currently running, and thus which process limit value (See FIG. 5) should be selected. Based on the process ID, the depth of store buffer 112 may be adjusted to account for the process or processes currently being run by processor 102. For each process, the process limit value in limit control register 141 may or may not be distinct. FIG. 5 illustrates several different process limit values which indicate of the upper bound of the depth of store buffer 112 to be utilized for each process.

Referring back to FIG. 1, since write operations are stored in store buffer 112 and not necessarily written to memory 120 immediately upon receipt, control circuitry 114 must be aware of when store buffer 112 is empty. Buffer empty signal 140 is provided to control circuitry 114, which indicates that store buffer 112 is empty. Note that in alternate embodiments the buffer empty signal 140 may be provided directly to interrupt priority logic 116.

By now it should be appreciated that there has been provided a flexible configuration mechanism for a write buffer that allows for interrupt latency to be varied with respect to write buffer performance. Configuration control for a write buffer dynamically configures the number of entries used to minimize overall maximum interrupt latency in a latency sensitive application. In one form there is provided a method for reducing interrupt latency in a data processing system by providing a storage device having a predetermined maximum number of storage locations. Data execution circuitry is coupled to the storage device for providing data to the storage device and storing the data in the storage device. Interrupt control circuitry is coupled to the data execution circuitry, the interrupt control circuitry interrupting the data execution circuitry. The outputting of stored data in the storage device is completed, thereby having an associated interrupt latency resulting from outputting of the stored data. Storage utilization of the storage device is dynamically changed to minimize the interrupt latency, the storage device having a utilization value that varies between a predetermined minimum number of storage locations and the predetermined maximum number of storage locations based upon an operating mode of the data processing system. The interrupt control circuitry is enabled to receive interrupt requests having a plurality of differing priorities. The operating mode of the system is implemented to be associated with priority of enabled interrupt requests. A size limit register is provided, the size limit register having one or more fields associated with at least one or more priorities for enabled interrupt requests having the plurality of differing priorities. Each of the one or more fields stores a limit value that defines the utilization value for each corresponding one or more fields. The size limit register is provided within the storage device. A size limit register is provided for storing a limit value that defines the utilization value of the storage device. The limit value is dynamically modifiable during operation of the data processing system. In one form the size limit register is within the storage device. In another form a size limit register is provided wherein the size limit register has one or more fields that store a predetermined limit value associated with a predetermined process of the data processing system. The limit value is dynamically modifiable during operation of the data processing system. In one form the size limit register is provided within the storage device. In another form a data processing system is provided having a storage device with a predetermined maximum number of storage locations. Data execution circuitry is coupled to the storage device for providing data to the storage device and storing the data in the storage device. Interrupt control circuitry is coupled to the data execution circuitry. The interrupt control circuitry interrupts the data execution circuitry and the interrupt control circuitry permits stored data in the storage device to be fully emptied thereby resulting in an interrupt latency. The interrupt control circuitry dynamically changes storage utilization of the storage device to minimize the interrupt latency. The storage device has a variable number of storage locations that varies between a predetermined minimum number of storage locations and the predetermined maximum number of storage locations based upon an operating mode of the data processing system. In one form the interrupt control circuitry receives interrupt requests that have a plurality of differing priorities and the operating mode of the data processing system is dependent upon a current priority of interrupt request. In another form the interrupt control circuitry has a plurality of inputs, each of the plurality of inputs receiving a predetermined one of interrupt requests that have a plurality of differing priorities. In another form, size limit storage circuitry is provided that has one or more fields associated with at least one or more priorities of the interrupt requests that have the plurality of differing priorities. The one or more fields store a limit value that defines the variable number of storage locations for a corresponding one or more fields. The size limit storage circuitry in one form is a register within the storage device. In another form a size limit storage device store a limit value that defines utilization of the storage device. The limit value is dynamically modifiable during operation of the data processing system. In another form the size limit storage device is a register within storage circuitry. In another form the data processing system further includes size limit storage circuitry, the size limit storage circuitry having one or more fields that store a predetermined limit value associated with a predetermined process of the data processing system. The predetermined limit value is dynamically modifiable during operation of the data processing system. In yet another form there is provided a method for reducing interrupt latency in a data processing system. Storage circuitry is provided having a predetermined maximum number of storage locations. Data execution circuitry is coupled to the storage circuitry for providing data to the storage circuitry and storing the data in the storage circuitry. Interrupt control circuitry is coupled to the data execution circuitry. The interrupt control circuitry interrupts the data execution means. Completion of the outputting of stored data in the storage circuitry is performed, thereby creating an associated interrupt latency resulting from outputting of the stored data. Storage utilization of the storage circuitry is dynamically altered to minimize the interrupt latency, the storage circuitry having a utilization value that varies between a predetermined minimum number of storage locations and the predetermined maximum number of storage locations based upon an operating mode of the data processing system. In one form interrupt control circuitry is enabled to receive interrupt requests having a plurality of differing priorities. In one form the operating mode of the system is implemented to be associated with priority of enabled interrupt requests. A size limiter is provided, the size limiter having one or more fields associated with at least one or more priorities for the enabled interrupt requests having the plurality of differing priorities. Each of the one or more fields stores a limit value that defines the utilization value for each corresponding one or more fields. In another form there is provided size limiter circuitry, the size limiter circuitry defining the utilization value of the storage circuitry, the utilization value being dynamically modifiable during operation of the data processing system. In another form there is provided a size limiter, the size limiter having one or more fields that store a predetermined limit value associated with a predetermined process of the data processing system. The predetermined limit value is dynamically modifiable during operation of the data processing system.

It should be apparent that various modifications may be made to the disclosed embodiments. For example, processor 102 may be implemented as any of a variety of differing types of data processing circuits for performing various types of processing functions. Any type of peripheral device may be coupled to processor 102 via the system bus, including coprocessors. The system may be implemented with any of a variety of differing bit sizes. Any type of storage device may be used for the described stores, registers and memories. Various attribute functions may be included within the attribute bits stored by the store buffer 112. Variations in the location within processor 102 of the described control circuitry, the mask register and other logic and register circuitry may be readily implemented. Any type of instruction and addressing scheme may be used in connection with the system 100 having reduced interrupt latency. Various types of interrupt handling algorithms may be utilized. The MASK value may be stored in any type of storage device, whether a register or a ROM, etc.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

What is claimed is:

1. A method for reducing interrupt latency in a data processing system comprising:
   providing a storage device having a predetermined maximum number of storage locations;
   coupling data execution circuitry to the storage device for providing data to the storage device and storing the data in the storage device;
   coupling interrupt control circuitry to the data execution circuitry, the interrupt control circuitry interrupting the data execution circuitry;
   completing outputting stored data in the storage device, thereby having an associated interrupt latency resulting from outputting of the stored data; and
   dynamically changing storage utilization of the storage device to minimize the interrupt latency, the storage device having a utilization value that varies between a predetermined minimum number of storage locations and the predetermined maximum number of storage locations based upon an operating mode of the data processing system.

2. The method of claim 1 further comprising:
   enabling the interrupt control circuitry to receive interrupt requests having a plurality of differing priorities; and
   implementing the operating mode of the system to be associated with priority of enabled interrupt requests.

3. The method of claim 2 further comprising:
   providing a size limit register, the size limit register having one or more fields associated with at least one or more priorities for the enabled interrupt requests having the plurality of differing priorities, each of the one or more fields storing a limit value that defines the utilization value for each corresponding one or more fields.

4. The method of claim 3 further comprising providing the size limit register within the storage device.

5. The method of claim 1 further comprising:
   providing a size limit register, the size limit register storing a limit value that defines the utilization value of the storage device, the limit value being dynamically modifiable during operation of the data processing system.

6. The method of claim 5 further comprising providing the size limit register within the storage device.

7. The method of claim 1 further comprising:
   providing a size limit register, the size limit register having one or more fields that store a predetermined limit value associated with a predetermined process of the data processing system, the limit value being dynamically modifiable during operation of the data processing system.

8. The method of claim 7 further comprising providing the size limit register within the storage device.

9. A data processing system comprising:
   a storage device having a predetermined maximum number of storage locations;
   data execution circuitry coupled to the storage device for providing data to the storage device and storing the data in the storage device; and interrupt control circuitry coupled to the data execution circuitry, the interrupt control circuitry interrupting the data execution circuitry, the interrupt control circuitry permitting stored data in the storage device to be fully emptied thereby resulting in an interrupt latency, the interrupt control circuitry dynamically changing storage utilization of the storage device to minimize the interrupt latency, the storage device having a variable number of storage locations that varies between a predetermined minimum number of storage locations and the predetermined maximum number of storage locations based upon an operating mode of the data processing system.

10. The data processing system of claim 9 wherein the interrupt control circuitry receives interrupt requests that have a plurality of differing priorities and wherein the operating mode of the data processing system is dependent upon a current priority of interrupt request.

11. The data processing system of claim 9 wherein the interrupt control circuitry has a plurality of inputs, each of the plurality of inputs receiving a predetermined one of interrupt requests that have a plurality of differing priorities.

12. The data processing system of claim 11 further comprising:
a size limit storage means that has one or more fields associated with at least one or more priorities of the interrupt requests that have the plurality of differing priorities, the one or more fields storing a limit value that defines the variable number of storage locations for a corresponding one or more fields.

13. The data processing system of claim 12 wherein the size limit storage means further comprises a register within the storage device.

14. The data processing system of claim 11 further comprising:
a size limit storage means for storing a limit value that defines utilization of the storage device, the limit value being dynamically modifiable during operation of the data processing system.

15. The data processing system of claim 14 wherein the size limit storage means further comprises a register within the storage device.

16. The data processing system of claim 11 further comprising:
size limit storage means, the size limit storage means having one or more fields that store a predetermined limit value associated with a predetermined process of the data processing system, the predetermined limit value being dynamically modifiable during operation of the data processing system.

17. The data processing system of claim 16 wherein the size limit storage means further comprise a register within the storage device.

18. A method for reducing interrupt latency in a data processing system comprising:
providing storage means having a predetermined maximum number of storage locations;
coupling data execution means to the storage means for providing data to the storage means and storing the data in the storage means;
coupling interrupt control means to the data execution means, the interrupt control means interrupting the data execution means;
completing outputting stored data in the storage means, thereby having an associated interrupt latency resulting from outputting of the stored data; and
dynamically changing storage utilization of the storage means to minimize the interrupt latency, the storage means having a utilization value that varies between a predetermined minimum number of storage locations and the predetermined maximum number of storage locations based upon an operating mode of the data processing system.

19. The method of claim 18 further comprising:
enabling the interrupt control means to receive interrupt requests having a plurality of differing priorities;
implementing the operating mode of the system to be associated with priority of enabled interrupt requests; and
providing a size limiter means, the size limiter means having one or more fields associated with at least one or more priorities for the enabled interrupt requests having the plurality of differing priorities, each of the one or more fields storing a limit value that defines the utilization value for each corresponding one or more fields.

20. The method of claim 18 further comprising:
providing a size limiter means, the size limiter means defining the utilization value of the storage means, the utilization value being dynamically modifiable during operation of the data processing system.

21. The method of claim 18 further comprising:
providing a size limiter means, the size limiter means having one or more fields that store a predetermined limit value associated with a predetermined process of the data processing system, the predetermined limit value being dynamically modifiable during operation of the data processing system.

* * * * *